United States Patent
Wang

(10) Patent No.: US 7,057,148 B2
(45) Date of Patent: Jun. 6, 2006

(54) OPTICAL TRACKING SENSOR METHOD

(75) Inventor: Chinlee Wang, San Jose, CA (US)

(73) Assignee: AMI Semiconductor, Inc., Pocatello, ID (US)

( * ) Notice: Subject to any disclaimer, the term of this patent is extended or adjusted under 35 U.S.C. 154(b) by 90 days.

(21) Appl. No.: 10/903,790

(22) Filed: Jul. 29, 2004

(65) Prior Publication Data

US 2006/0022116 A1    Feb. 2, 2006

(51) Int. Cl.
*H01L 27/00* (2006.01)
*G06K 7/015* (2006.01)
*G01N 21/86* (2006.01)
*G09G 5/08* (2006.01)

(52) U.S. Cl. .............. 250/208.1; 250/557; 250/559.1; 250/559.29; 345/166

(58) Field of Classification Search .............. 250/557, 250/208.1; 345/166
See application file for complete search history.

(56) References Cited

U.S. PATENT DOCUMENTS

| | | | |
|---|---|---|---|
| 5,644,139 A * | 7/1997 | Allen et al. ............... | 250/557 |
| 6,047,091 A | 4/2000 | Anderson | |
| 6,049,338 A | 4/2000 | Anderson et al. | |
| 6,097,851 A | 8/2000 | Anderson | |
| 6,195,475 B1 | 2/2001 | Beausoleil, Jr. | |
| 6,281,882 B1 * | 8/2001 | Gordon et al. .............. | 345/166 |
| 6,297,513 B1 | 10/2001 | Oliver et al. | |
| 6,373,994 B1 | 4/2002 | Anderson | |
| 6,455,840 B1 | 9/2002 | Oliver et al. | |

* cited by examiner

*Primary Examiner*—Georgia Epps
*Assistant Examiner*—Pascal M. Bui-Pho
(74) *Attorney, Agent, or Firm*—The Kline Law Firm

(57) ABSTRACT

The present invention is a method of optical tracking sensing using block matching to determine relative motion. The method includes three distinct means of compensating for non-uniform illumination: (1) a one-time calibration technique, (2) a real-time adaptive calibration technique, and (3) several alternative filtering methods. The system also includes a means of generating a prediction of the displacement of the sampled frame as compared to the reference frame. Finally, the method includes three cumulative checks to ensure that the correlation of the measured displacement vectors is good: (1) ensuring that "runner-up" matches are near the best match, (2) confirming that the predicted displacement is close to the measured displacement, and (3) block matching with a second reference frame.

18 Claims, 6 Drawing Sheets

Previous Frame
(x, y) = (0, 0)

Current Frame
(Δx, Δy) = (+1, -2)

←——— Match ———→

OPTICAL TRACKING SENSOR METHOD

BACKGROUND OF THE INVENTION

1. Field of the Invention

The present invention relates generally to scanning devices, and more particularly is an optical tracking sensor method such as may be used in a computer mouse.

2. Description of the Prior Art

An optical sensor that can detect relative motion and position is very useful as a component of an optical computer mouse, and in other very useful optical tracking applications. The purpose of the optical sensor is to detect relative motion between the sensor and a patterned or textured "work" surface. The optical sensor works by capturing successive images of a patterned and/or textured work surface, and then determining successive displacement vectors.

FIG. 1 shows the basic components of a current art optical mouse system. A light source and an optical waveguide illuminate a pattern in a work surface. The pattern is often microscopic and not readily visible to the naked eye. An optical lens images the work surface onto a focal-plane sensor chip. With an integrated imaging array, analog circuitry, analog-to-digital converter (ADC), and a digital signal processor, the sensor chip converts the optical inputs into x and y displacement vector outputs. These outputs are used to determine the direction and magnitude of the movement of the mouse.

One commonly used method of calculating vector outputs from an optical sensor is "block matching". The basic concept of the block matching technique is illustrated in FIG. 2. In block matching, images of a block of the work surface (a window of pixels) are taken by an imaging array at two different times. The images are then compared for matching. Perfectly matched blocks indicate identical locations on the work surface. Any displacement found between the two compared image blocks represents the displacement of the sensor, i.e. how much the sensor has moved, relative to the work surface.

An ideal imaging array has pixel voltage outputs that can be represented as follows:

$$V_{pixel}(i,j,x,y) = S(i+x, j+y)$$

where $V_{pixel}$ is the voltage output in column i and row j when the sensor is at a horizontal displacement of x and vertical displacement of y with respect to the surface, and S is light reflected towards the imaging sensor from the work surface under uniform illumination. The units of x and y are chosen so that one unit distance on the work surface will be imaged into a distance of one pixel in the sensor. As the sensor moves, x and y will change over time. In the case illustrated in FIG. 2, (x,y) changed from (0,0) to (+1,−2), that is (Δx,Δy)=(+1,−2). Pixel (i,j)=(4,4) can be used as a reference, as it is approximately in the middle of the first frame image. The voltage output of this pixel would be $$V_{pixel}(4,4,0,0) = S(4,4)$$

which is the same as the voltage of pixel (3, 6) in the second frame:

$$V_{pixel}(3,6,+1,-2) = S(4,4).$$

The first frame pixel (4, 4) and the second frame pixel (3, 6) are matching pixels. Their neighboring pixels form a matching block. The negative offset between matching pixels and matching blocks is (−Δi,−Δj)=(+1,−2) which equals the displacement of the sensor relative to the work surface.

The block matching calculation takes the following form:

$$\min_{\Delta i, \Delta j} \sum_{i=0}^{m-1} \sum_{j=0}^{m-1} |V_{pixel}(i+\Delta i, j+\Delta j, x+\Delta x, y+\Delta y) - V_{pixel}(i,j,x,y)|^n$$

where m is the width and height of the blocks and n is typically 1 or 2. The first $V_{pixel}$ term is the pixel voltage output in the current frame at some offset (Δi,Δj). The second $V_{pixel}$ term is the pixel voltage output in the reference (a previous) frame. The absolute difference is a measure of the mismatch of the pixel outputs. The summation is taken over all the pixels in the blocks which must remain inside the images. The offset (Δi,Δj) for which the summation is minimal corresponds to the best match. The displacement (Δx,Δy) found by block matching would then be (−Δi,−Δj).

As with most methods, the block matching technique can be implemented and improved in several formats. Accordingly, a chief object of the present invention is to optimize the method of calculating the direction and magnitude of the displacement vectors of the optical sensor, and then processing those outputs.

Another object of the present invention is to provide a real-time adaptive calibration function with the sensor.

Still another object of the present invention is to provide a system that maximizes working dynamic range while minimizing power consumption.

SUMMARY OF THE INVENTION

The present invention is a method of optical tracking sensing using block matching to determine relative motion. The method comprises three distinct alternative means of compensating for non-uniform illumination: (1) a one-time calibration technique, (2) a real-time adaptive calibration technique, and (3) several alternative filtering methods. The system also includes a means of generating a prediction of the displacement of the sampled frame as compared to the reference frame. Finally, the method comprises three cumulative checks to ensure that the correlation of the measured displacement vectors is good: (1) ensuring that "runner-up" matches are near the best match, (2) confirming that the predicted displacement is close to the measured displacement, and (3) block matching with a second reference frame.

An advantage of the present invention is that it has multiple means of compensating for non-uniform illumination.

Another advantage of the present invention is that it has multiple means of checking the output results.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 3:
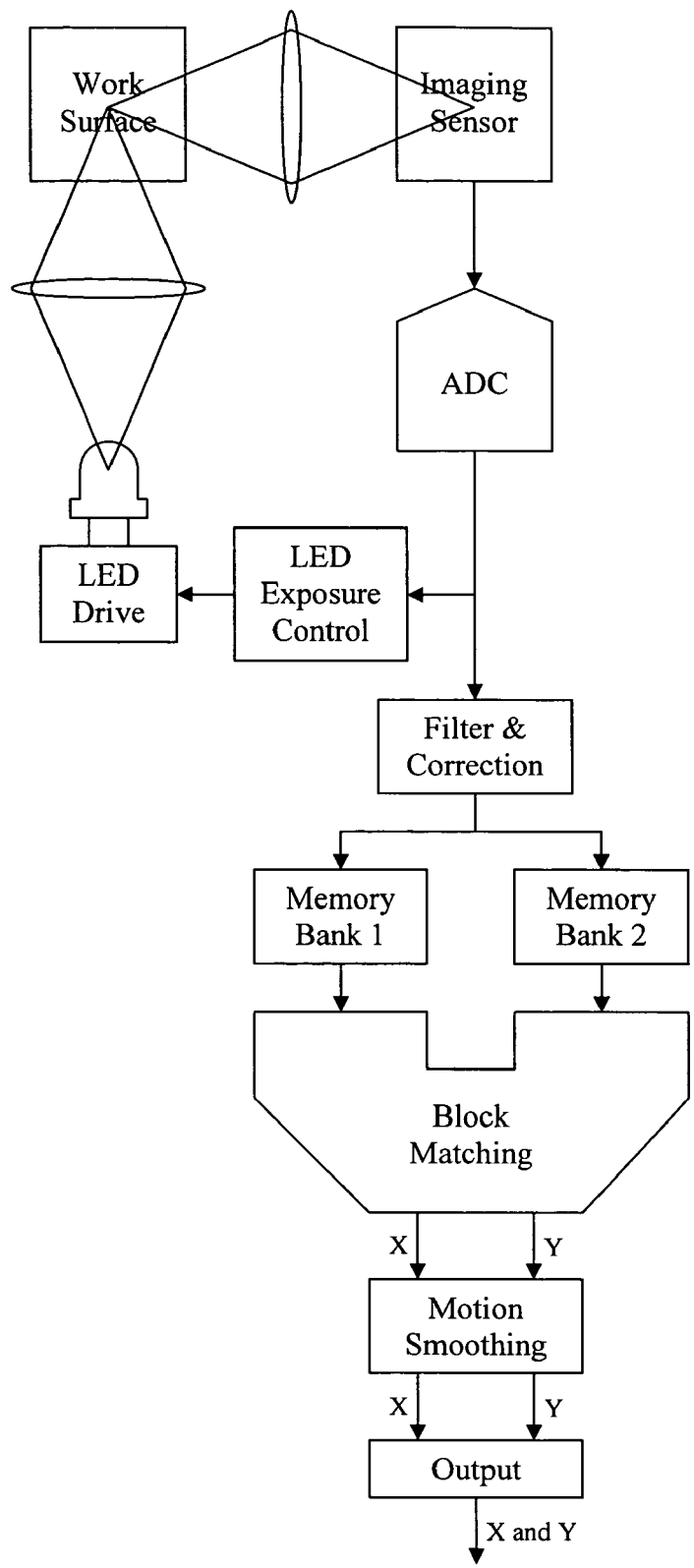
FIG. 3 is a block diagram showing the structure of the optical scanner of the present invention.
Figure 4:
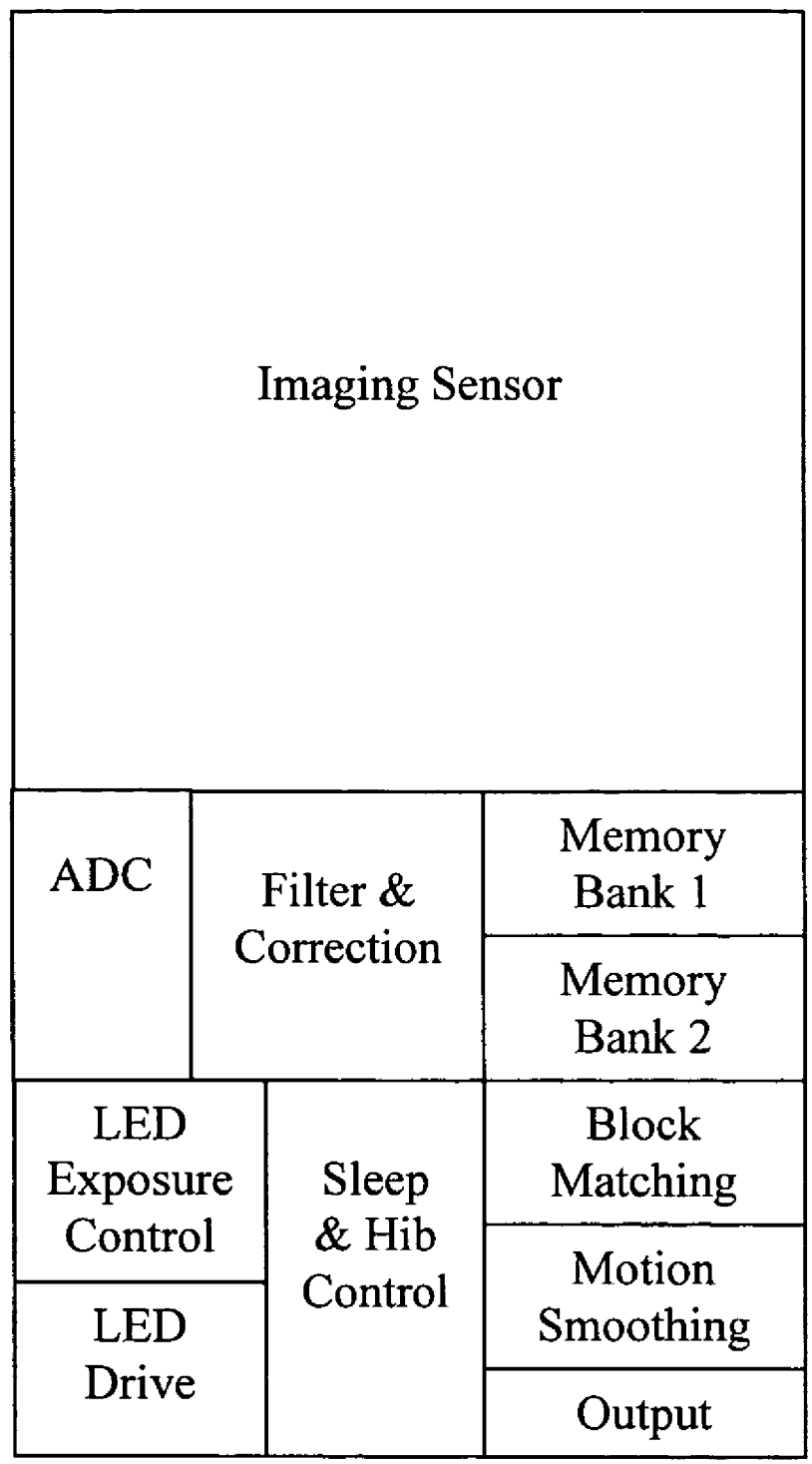
FIG. 4 is a basic floor plan of the integrated circuit implementing the method of the present invention.
Figure 5:
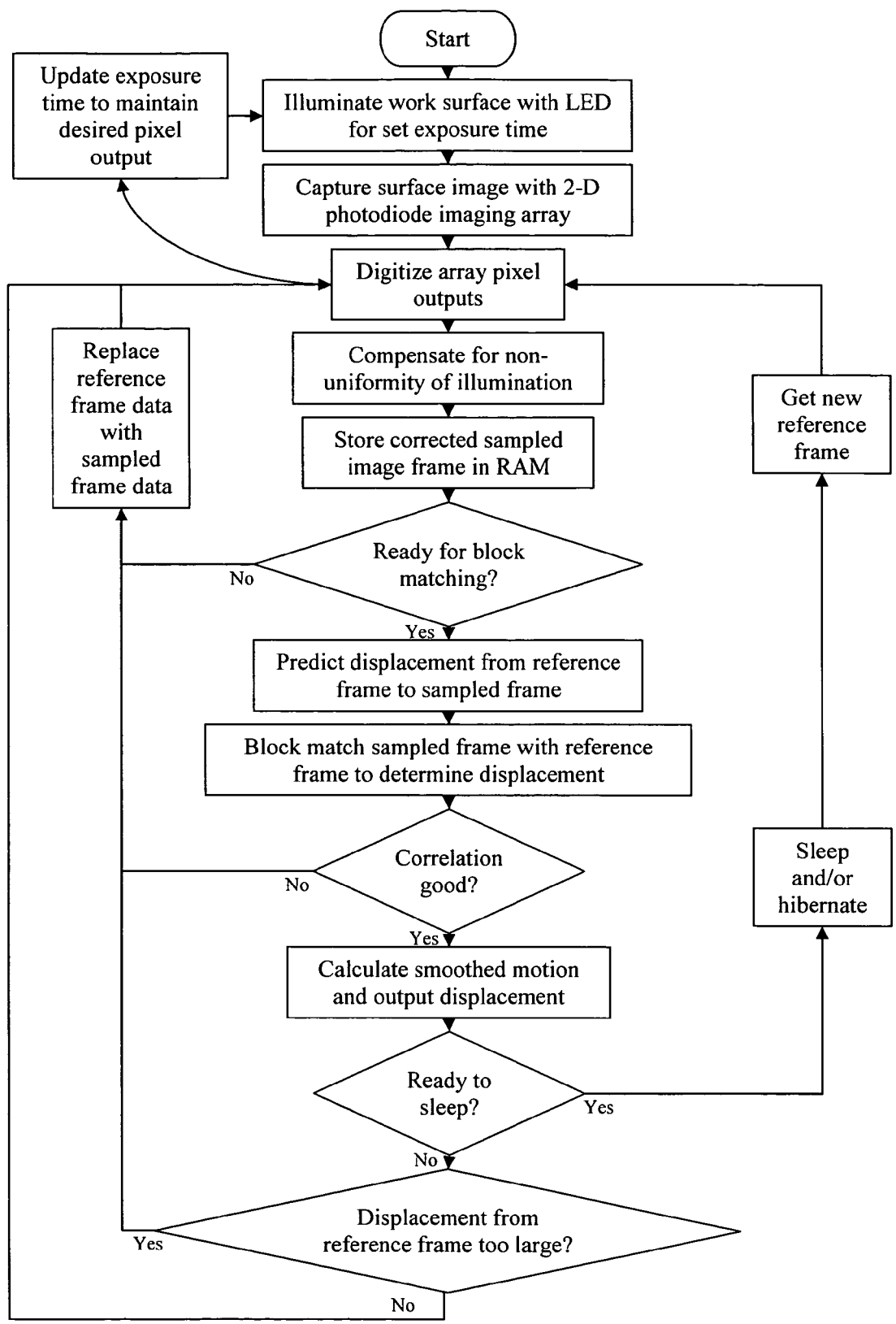
FIG. 5 is a flow chart of the method of the present invention.
Figure 6:
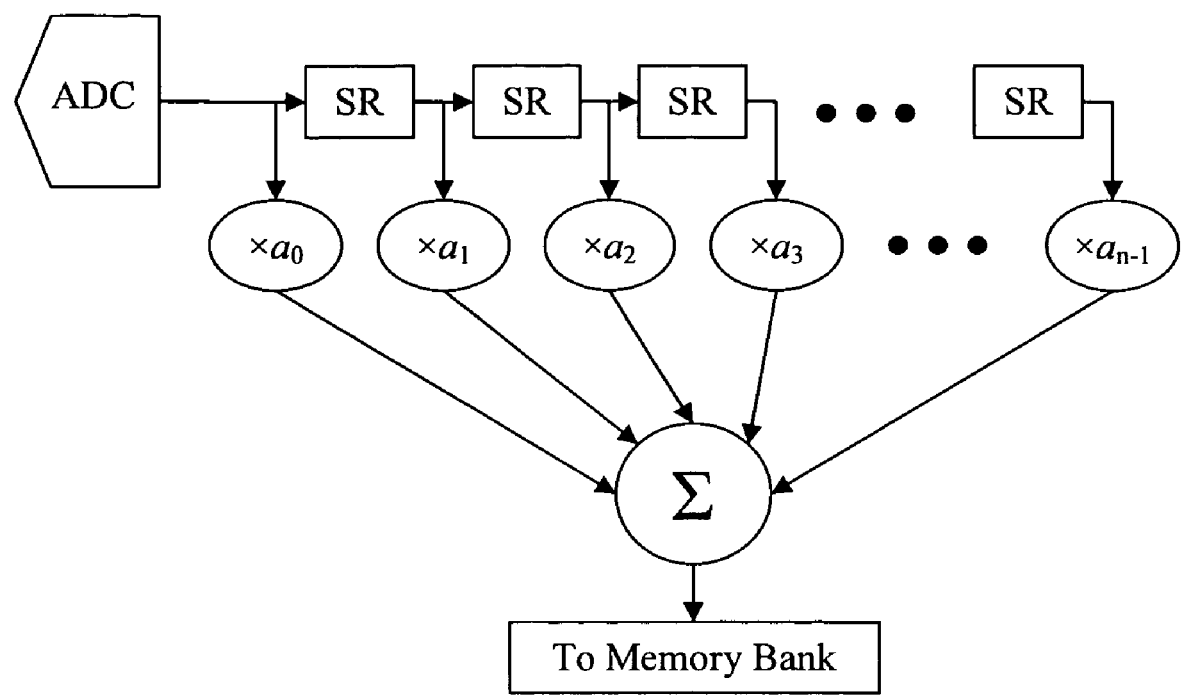
FIG. 6 is a schematic representation of a filtering means of the present invention.

The present invention is a method of using an optical sensor to determine displacement relative to a work surface. FIG. 3 shows the functional block structure of the invention, and FIG. 4 demonstrates a typical floor plan of an integrated circuit implementation of the method. The imaging sensor used in the system is a two-dimensional array of photodiodes that is positioned at the focused image of the work surface. The incidence of photons on the silicon in the image sensor array pixels generates electrons that are collected by the pixel photodiodes. After a collection (or integration) period, a frame of pixel signals is read out and converted to digital values by the ADC (analog/digital converter). The digital image data is passed through a filter and/or correction circuitry. The filtered data from an image frame is then stored in one of two or three memory banks.

Figure 1:
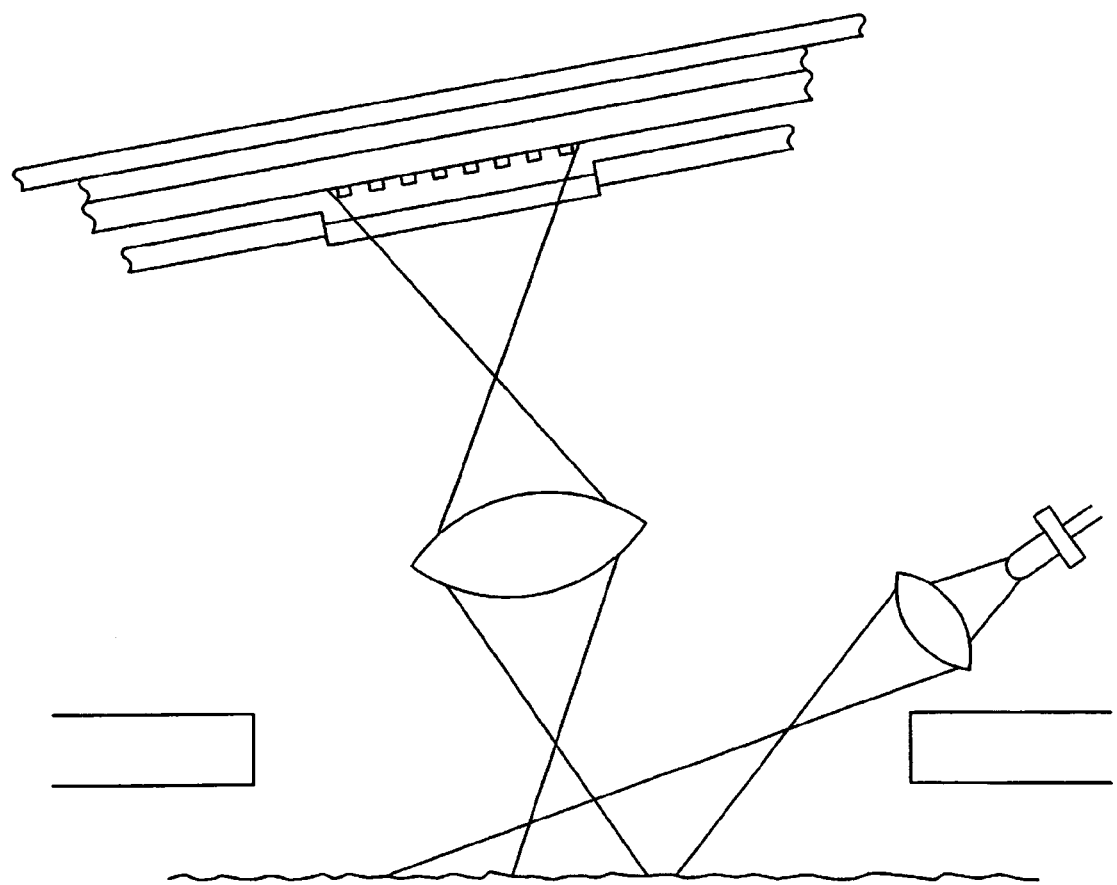
FIG. 1 is a schematic view of a prior art optical mouse.
Figure 2:
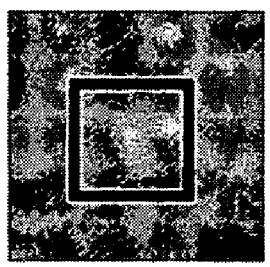
FIG. 2 is a schematic view of the block matching technique employed in optical scanners.
Figure 2:
Figure 2:
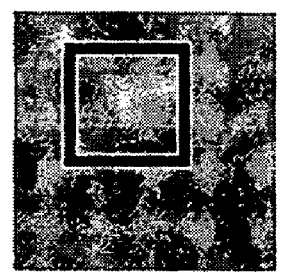
Figure 2:
Figure 2:
Figure 2:

As the mouse (or other device containing the sensor) is moved, another image is captured and stored in the same fashion. Then the image data from the successive frames now stored in the two memory banks are compared using the block-matching algorithm described above. By finding matching blocks in the two frames, the relative displacement between the frames is found (see FIG. 2). The x and y components of the calculated displacement are smoothed (detailed description below) and then encoded for output. By adjusting the amount of illumination, the LED (light emitting diode) control module keeps the image signal level within an acceptable range. A power control module (not shown) allows the system to power down into sleep and hibernation modes when a period of no movement is detected and power up into active mode when movement is detected.

The unique features of the present invention are chiefly in the processing of the signals collected by the sensor. The process is started by powering up the chip containing the circuit. The circuit detects power up and resets, initializing baseline values such as default LED exposure time and zero initial velocity. Residual charges in the image sensor are eliminated by reading a few frames.

After startup, the work surface is illuminated, by an LED in the preferred embodiment, for a set exposure time. The LED can be integrated with the sensor IC or into the sensor IC packaging. The illumination should be as uniform as possible.

Next, the pattern and/or texture of the work surface is imaged through a lens to the imaging sensor array. The imaging sensor comprises a two-dimensional array of sensing elements, each sensing element corresponding to a picture element (pixel) of the imaged portion of the work surface. In the preferred embodiment, the sensing elements are photodiodes that convert the light signals (photons) into electrical signals. Each pixel in the image corresponds to a single photodiode. The image sensing array outputs an electrical signal (such as a voltage, charge, or current) that is proportional to the light received at each sensing element from the work surface.

Next, the system digitizes the array pixel outputs. An analog-to-digital converter (ADC) converts each photodiode output (pixel) to a digital value. This can be done with a single ADC for the entire array, an ADC per column/row, or an ADC per pixel. In the preferred embodiment, the digitized signal is read-out pixel-by-pixel, row-by-row, or column-by-column. If the sensor pixels have built-in sample-and-store circuitry so that exposure can be sampled simultaneously for all pixels, then illumination can be concurrent with the image sensor readout. Concurrent illumination and readout enables faster frame rates. Otherwise when each pixel is sampled at its own read-out time, illumination must be between sensor readout periods so that exposure time will not vary between pixels.

The exposure time of the sensing array is adjusted to maintain output in a predetermined range. This operation is performed in parallel with the compensation for non-uniformity of illumination (more fully described below.) It is desirable to maintain output levels at a certain magnitude even in view of different LED efficiencies and work surface reflectivities. This is done in the system of the present invention by adjusting the LED exposure time, the LED current, the amplification of the pixel outputs (automatic gain control), and/or the input range of the digitizer (analog-to-digital converter). Adjusting these parameters extends the working dynamic range of the sensor array. For example, on more reflective (brighter) surfaces, the system reduces the LED exposure. If the frame period time is limited by the exposure time, shortening the exposure time allows the frame rate to increase and thus increase the maximum tracking speed. Even if the frame rate is not increased, the reduced LED exposure time allows the system to reduce power consumption. On less reflective (darker) surfaces, the LED exposure time is extended to improve tracking accuracy. In the preferred embodiment, the LED exposure is adjusted so that the maximum pixel output is maintained at about half of full range. If this maximum output value deviates by a relatively small amount, then the LED exposure is adjusted by a very small amount ("micro-steps") per frame towards the desired exposure so that the block matching is not disturbed. This micro-step adjustment allows the block matching to continue uninterrupted. If this value drops below a certain minimum trigger level, then the LED exposure is doubled and the reference frame is flushed. Similarly, if the maximum output value rises above a predetermined trigger level, then the LED exposure is halved. (The prior art devices, e.g., Agilent HDNS-2000, Agilent ADNS-2051, STMicroelectronics optical mouse sensor, use a constant LED exposure time and brightness per frame (a constant duty cycle) when actively tracking high and low reflective work surfaces. This either reduces the work dynamic range, or forces the use of an automatic gain control. This also forces the product to waste electrical current to power the LED.)

The compensation for any non-uniformity of illumination is performed in parallel with the above adjustment of the exposure time. Non-uniformities of the illumination of the work surface and non-uniformity of the sensor pixel responses present difficulties for the block matching technique. Non-uniformities would result in pixel voltage outputs of the following form:

$$V_{pixel}(i,j,x,y) = D(i,j) + R(i,j) \cdot S(i+x, j+y)$$

where $D(i,j)$ is the non-uniform pixel voltage output in the dark and $R(i,j)$ is the combination of the non-uniformities in the illumination and non-uniformities in the sensor pixel responses. (Since illumination is fixed with respect to the sensor, the illumination corresponding to a given pixel does not change.) Taking the pixel voltage output difference term in the block matching equation with $(-\Delta i, -\Delta j)=(\Delta x, \Delta y)$, we get $$V_{pixel}(i-\Delta x, j-\Delta y, x+\Delta x, y+\Delta y) - V_{pixel}(i,j,x,y).$$

Substituting the previous equation, we get the expression $$D(i+\Delta x, j+\Delta y) + R(i+\Delta x, j+\Delta y) \cdot S(i+x, j+y) - [D(i,j) + R(i,j) \cdot S(i+x, j+y)].$$

which equals $$[D(i+\Delta x, j+\Delta y) - D(i,j)] + [R(i+\Delta x, j+\Delta y) - R(i,j)] \cdot S(i+x, j+y)$$

To optimize block matching, this term needs to be minimized. If variations in either the D( ) term or the R( ) term are too large, the block matching will give erroneous results. Elimination or reduction of the effects of non-uniformity provides significant improvement in matching and thus performance.

The output values are corrected so that the corrected outputs are uniform in their response in both dark and light. The goal is to generate corrected pixel outputs equal to $$V'_{pixel}(i,j,x,y) = S(i+x, j+y).$$

So that, $$V'_{pixel}(i, j, x, y) = \frac{V_{pixel}(i, j, x, y) - D(i, j)}{R(i, j)}.$$

The system of the present invention has two distinct and unique capabilities to perform the desired output correction.

(1) One-time calibration prior to use: After the system is assembled with light source, optics, and sensor, the output of each pixel is measured over a perfectly uniform surface. Correction values are calculated for each pixel reading. These correction values are then used to correct each pixel output value each time a pixel is read, so that the corrected pixel outputs are uniform in their response in both dark (no illumination) and light (some illumination that doesn't saturate the sensor) conditions. In the preferred embodiment, a two-point correction is used for the pixel correction. For each pixel, its output is measured in two conditions during calibration: in dark and in light. Assume the two pixel values are recorded as $V_{dark}(i,j)$ and $V_{light}(i,j)$. Then, $$D(i, j) = V_{dark}(i, j)$$

and $$R(i, j) = \frac{V_{light}(i, j) - V_{dark}(i, j)}{V_{expected}}.$$

where $V_{expected}$ is a constant expected value of the pixel output voltage in the light condition. So, the corrected pixel voltage output would then be $$V'_{pixel}(i, j, x, y) = V_{expected} \frac{V_{pixel}(i, j, x, y) - V_{dark}(i, j)}{V_{light}(i, j) - V_{dark}(i, j)}.$$

In the preferred embodiment, a non-volatile memory stores the correction values. The one-time calibration improves performance of the optical mouse by eliminating a source of error from non-uniformities. It also significantly improves manufacturing yields by compensating for weak photodiodes (pixels that don't response as strongly to light) that would otherwise make the sensor array unusable.

(2) Real-time adaptive calibration: Real-time adaptive calibration is most valuable in cases where calibration during production and non-volatile memory are too expensive to be implemented. As with the one-time calibration process, there are two calibration steps to the adaptive calibration—dark calibration and light calibration. The dark calibration needs only to occur once during an initialization each time the chip is powered on, while the light source is off. The offsets $V_{dark}(i,j)$ in the pixels' dark outputs are measured and stored for correction of subsequent pixel outputs. The light calibration occurs in real-time and adaptively while the sensor is moving over the work surface. This real-time adaptive light calibration works on the premise that the block matching algorithm (see below) will find matching blocks, corresponding to the same area of the work surface, in the images taken at subsequent times. Strong, distinct patterns in the work surface will facilitate this matching. Given that a match is found, the differences between the two matching blocks in large part are due to non-uniformities (in lighting and pixel responses) between corresponding pixels of the two blocks. Corrective factors for each pixel are generated to compensate the block differences. In the preferred embodiment, the center pixel has no correction. Corrective factors for pixels around the center are generated when matching blocks expose differences between those pixels and the center pixel. Corrective factors for pixels away from the center are calculated when those pixels are matched to already corrected pixels. The corrective factors are averaged over multiple matches. Real-time adaptive calibration improves performance of an optical mouse by eliminating one source of error, illumination non-uniformities. It also significantly improves manufacturing yields by compensating for weak photodiodes (pixels that don't respond as strongly as they should to light) that would otherwise make the sensor unusable. Real-time adaptive calibration has an additional benefit over one-time calibration in that it doesn't require the added complication or cost of storing the calibration coefficients while the device has no power source.

Filtering the output signals is a less expensive alternative to non-uniformity correction. Filtering deemphasizes long-range (low-spatial-frequency) variations in $R(i,j)$ typically caused by illumination non-uniformity. The system of the present invention utilizes two types of filtering schemes:

(1) 1-D edge detection filtering: This method requires a relatively low computational load. In the preferred embodiment, the 1-D filter takes the form of a finite impulse response (FIR) filter. This can be implemented with a shift register, multipliers, and an accumulator. This implementation will limit the resource usage by avoiding the need for a memory array for storing the raw unfiltered image data. This implementation is also very efficient in its computation resource usage. With this structure, the following computation can be made efficiently:

$$V'_{pixel}(i, j, x, y) = \sum_{k=0}^{n-1} a_k V_{pixel}(i+k, j, x, y).$$

The actual FIR filter coefficients are chosen to be symmetric and to sum up to zero in order to filter out low spatial frequency components associated with DC offsets and LED illumination non-uniformity. That is, $$\sum_{k=0}^{n-1} a_k = 0$$

and $$a_k = a_{n-1-k}.$$

Such filters coefficients eliminate DC (0th order, e.g. R(i,j) =c) and sloped illumination (1$^{st}$ order, e.g. R(i,j)=m$_x$i+m$_y$j) components. We see that if $$R(i,j)=m_x i+m_y j+c,$$

then the FIR filter would render these non-uniformity contributions negligible:

$$\sum_{k=0}^{n-1} a_k R(i+k, j) = \sum_{k=0}^{n-1} a_k [m_x(i+k) + m_y j + c]$$

$$= \sum_{k=0}^{n-1} a_k [m_x(i+k)] + [m_y j + c] \cdot \sum_{k=0}^{n-1} a_k$$

$$= \sum_{k=0}^{n-1} \frac{a_k + a_{n-1-k}}{2} [m_x(i+k)] + [m_y j + c] \cdot 0$$

$$= \frac{1}{2} \left[ \sum_{k=0}^{n-1} a_k [m_x(i+k)] + \sum_{k=0}^{n-1} a_{n-1-k} [m_x(i+k)] \right]$$

$$= \frac{1}{2} \left[ \sum_{k=0}^{n-1} a_k [m_x(i+k)] + \sum_{l=n-1}^{0} a_l [m_x(i+(n-1-l))] \right]$$

$$= \frac{1}{2} \sum_{k=0}^{n-1} a_k m_x [(i+k) + (i+(n-1-k))]$$

$$= \frac{1}{2} \sum_{k=0}^{n-1} a_k m_x (2i+n-1)$$

$$= \frac{1}{2} m_x (2i+n-1) \cdot \sum_{k=0}^{n-1} a_k$$

$$= 0$$

Such coefficients also emphasize edges to enhance the surface pattern and texture. Care must be taken to avoid emphasizing aliasing effects. Examples of filter coefficients are −1, −1, 2, 2, −1, and −1 for a 6-tap FIR filter. Also, −1, 0, 1, 1, 0, −1. Also, −1, 1, 1, −1.

(2) 2-D common-centroid edge detection filtering: This method utilizes 2-D filtering where the outputs of multiple pixels are multiplied with coefficients and summated to form pixels of a filtered image.

$$V'_{pixel}(i, j, x, y) = \sum_{k=0}^{n-1} \sum_{l=0}^{n-1} a_{k,l} V_{pixel}(i+k, j+l, x, y)$$

The coefficients have a common-centroid pattern. The common-centroid technique is similar to that used in the layout technique bearing the same name, in which the 1$^{st}$ order components of process variations (e.g. a linear gradient of sheet resistance) are cancelled. The common-centroid coefficients are symmetric and sum up to zero so that the 1$^{st}$ order components of lighting variations (e.g. a linear gradient of illumination) are eliminated. That is, $$\sum_{k=0}^{n-1} \sum_{l=0}^{n-1} a_{k,l} = 0$$

and $$a_{k,l} = a_{n-1-k,n-1-l}.$$

Examples of a two-dimensional common-centroid are:

| −1 | +1 |
|---|---|
| +1 | −1 | and

| +1 | −1 | +1 |
|---|---|---|
| −1 | 0 | −1 |
| +1 | −1 | +1 |

Suppose the illumination has a 1$^{st}$ order (linear) gradient from the lower left to the upper right of the pixel array, for example R(i,j)=1+i+j. In this example, its contribution to the image over a 3×3 pixel array would be:

| 3 | 4 | 5 |
|---|---|---|
| 2 | 3 | 4 |
| 1 | 2 | 3 |

The above 3×3 common-centroid coefficients would multiply with the illumination effect as follows:

| 3 | −4 | 5 |
|---|---|---|
| −2 | 0 | −4 |
| 1 | −2 | 3 | which sums to 0. In other words, the 0$^{th}$ and 1$^{st}$ order components of non-uniform illumination are eliminated by the common-centroid filtering. Higher spatial frequency image components that might be caused by surface irregularities would not be filtered out, but rather would be enhanced by the filtering.

A final alternative used in the system of the present invention for "cleaning up" the output signal is a time-based differential technique. This technique emphasizes edges and other high spatial frequency components without emphasizing non-uniformities in lighting or pixel response. It basically increases signal without increasing noise. In the block matching, $V_{pixel}$ is replaced by its time-based differential:

$$\frac{dV_{pixel}(i, j, x, y)}{dt}\Delta t = R(i, j) \cdot \frac{dS(i+x, j+y)}{dt} \cdot \Delta t.$$

The last differential term equals $$\frac{dS(i+x, j+y)}{dt} = \frac{\partial S(i+x, j+y)}{\partial x}\frac{dx}{dt} + \frac{\partial S(i+x, j+y)}{\partial y}\frac{dy}{dt}.$$

This differential emphasizes edges and other high frequency spatial components without emphasizing the non-uniformities in R(i,j). Thus, it increases signal without increasing noise in the block matching calculation. One drawback is that it only works when there is movement. This method must be combined with some other method to handle low speed. Also, if the method is implemented using RAM, it requires an extra bank of memory. If the method is accomplished by a pixel implementation, analog storage space is required.

Regardless of the signal optimization techniques chosen, the system next takes the "scrubbed" signal and stores the sampled image frame in one of two or three memory banks. The system then determines whether block matching is appropriate. The system checks whether the reference frame data is valid before continuing. The reference frame data may be invalid if a reference frame has not yet been captured yet, or if the sensor array has just been powered up and requires time to settle and to be flushed out. If the reference frame data is invalid, then the system goes to the "Replace reference frame data with sampled frame data" step.

Next, the system samples displacements over several frames to predict the displacement vector for the current frame relative to the reference frame. The average of the displacements for the previous several frames is taken as the predicted displacement for the current frame. There is no known equivalent to this prediction step found in the prior art.

Now the sampled frame is ready to be block matched with the reference frame to determine displacement. (The block matching techniques is described above under Prior Art.) Comparisons are computed for a number of displacement vectors. The displacement vector with the best match is selected. The comparisons may be computed in several fashions, two being: (1) Sum of the squared difference of individual pixel values from reference block and sampled block (n=2). The lower the sum calculated, the better the match. (2) Sum of the absolute difference of individual pixel values from reference block and sampled block (n=1). Again, the lower the sum calculated, the better the match. The prediction of displacement in the previous step can reduce the number of displacement vectors required to be tested, and thus reduce computation. Occasionally, due to noise and non-uniformities, the block matching algorithm finds a false match. Shrinking the number of possible valid displacement vectors with prediction reduces the chance of error.

Now the system must confirm that the correlation is good. Several checks can be made to assure that the block matching correlation is correct. A "goodness" matrix can be formed from several of these checks. If the goodness matrix is higher than a certain limit, then the correlation is considered good. The correlation check is used to ensure that the sensor module appears to be in direct contact with the work surface (not "airborne"). If the image appears too flat, then the sensor is likely to be "airborne."

The correlation check also ensures that the work surface has enough features to provide good block matching. If the difference between the best block match comparison matrix and the worst block match comparison matrix is too small, then the work surface is likely to be too smooth and too devoid of features for proper operation.

The system further ensures that the best match is significantly better than other matches. The difference between the best block match comparison matrix and the next best ("runner-up") block match comparison matrix is examined. The system ensures that the "runner-up" matches are those neighboring the best match. If the "runner-up" match displacement is too distant from the best match displacement, then the block matching is more likely to have been confused by a repeating surface pattern, such as a silkscreen pattern used on some tabletops. Experiments have found that rejecting block matching results with distant "runner-up" matches leads to better overall performance.

The system also checks to ensure that best block match yields a result that is close to the predicted displacement. If the best match is far from the prediction, then the goodness matrix is lowered.

Finally, the system compares the initial match with the results of block matching to a second reference frame if available. The results of the two block matching iterations are compared as a "sanity check". A third memory bank is required to store the second reference frame.

When the system has ascertained that a valid block match has been found, it calculates a smoothed motion and output displacement. The displacement output of the block matching phase is averaged for smoothing and outputted.

The system then determines whether it should enter sleep or hibernation mode. After periods of no motion and/or a USB suspend signal, the circuit goes into a sleep or hibernate mode to save power. Sleep mode provides some power savings by reducing LED and circuit power with a lower effective frame rate. Hibernate mode provides drastic power savings by suspending circuit operation for relatively long periods of time. During the hibernation period, all circuits are powered down except for a low-power clock oscillator, a timer, and a watchdog circuit for the USB port. If the watchdog circuit detects activity on the USB port, then the USB circuit "wakes up". In order to enable self wake-up capability (e.g. for USB remote wake-up), the circuit will periodically wake up to check for motion. If motion is detected, the circuit will stay active, otherwise it will return to the low-power mode. No known prior art has motion induced remote wake-up capability. The remote wake-up on all known optical mice requires button activity. When the system emerges from the sleep or hibernation mode, a new reference frame is of course required.

After the calculation of a displacement vector, the system checks to see whether a new reference frame is required. The reference frame is not replaced after every frame that is sampled. If the current displacement from the reference frame is small enough to accommodate the next displacement, then the reference frame can be used again. If the current displacement is too large, then the reference frame data is replaced with sampled frame data, so that the current sampled frame data becomes the reference frame for the next several frames. Every time this replacement is made, there is a certain amount of quantization error that accumulates as a real displacement value is rounded off to an integer value. This is why the number of times that the reference frame is updated is minimized. If the reference frame requires updating, instead of copying the current sampled frame data from its memory bank to the reference frame data memory bank, the pointer to the current sampled frame data memory bank can be copied to the pointer for the reference frame. An optional second reference frame may be similarly updated with sampled frame data or the first reference frame data that would otherwise be discarded.

The above disclosure is not intended as limiting. Those skilled in the art will recognize that numerous modifications and alterations may be made while retaining the teachings of the invention. Accordingly, the above disclosure should be construed as limited only by the restrictions of the appended claims.

I claim:

1. A method of optical tracking sensing comprising the following steps:
   a. illuminating a work surface with a light source for a preset exposure time,
   b. capturing a surface image with a two-dimensional imaging array,
   c. digitizing the outputs of said imaging array,
   d. compensating for non-uniformity of illumination by a one-time calibration,
      wherein an output of each pixel is measured over a perfectly uniform surface, with correction values being calculated for each element of said imaging array, said correction values then being used to correct each output value of each said element of said imaging array each said element is read, so that corrected outputs are uniform in their response in both dark and light conditions,
   e. block matching said outputs to a reference frame, and
   f. calculating and outputting displacement vectors.

2. The method of claim 1 wherein: said one-time calibration is accomplished by a two-point correction, each output being measured in dark and in light conditions, said output values being recorded as $V_{dark}(i,j)$ and $V_{light}(i,j)$, such that, $D(i,j)=V_{dark}(i,j)$, and $$R(i, j) = \frac{V_{light}(i, j) - V_{dark}(i, j)}{V_{expected}},$$

wherein $V_{dark}$ is a voltage taken with no illumination, $V_{light}$ is a voltage taken with a given light condition, i and j are a column and row coordinates of a designated pixel, respectively, $D(i,j)$ is a non-uniform pixel voltage output with no illumination, $R(i,j)$ is a combination of non-uniformities in the illumination and non-uniformities in the sensor pixel responses, and $V_{expected}$ is a constant expected value of an output voltage in said light condition, a corrected output voltage therefore being $$V'_{pixel}(i, j, x, y) = V_{expected} \frac{V_{pixel}(i, j, x, y) - V_{dark}(i, j)}{V_{light}(i, j) - V_{dark}(i, j)},$$

wherein x and y are the respective horizontal and vertical displacement vector output.

3. The method of claim 1 wherein:
a prediction of a displacement from said outputs to said reference frame is made, said prediction being made by sampling displacements over several frames to predict a displacement vector for the current frame relative to the reference frame, an average of the displacements for the previous several frames being taken as the predicted displacement for a current frame.

4. The method of claim 3 wherein:
following said block matching of said outputs to said reference frame, a displacement result is compared with said prediction of displacement.

5. The method of claim 1 wherein:
following said block matching of said outputs to said reference frame, a difference between a best block match comparison matrix and a "runner-up" block match comparison matrix is examined to ensure that "runner-up" matches are those neighboring said best block match.

6. The method of claim 1 wherein:
following said block matching of said outputs to said reference frame, said outputs are block matched to a second reference frame.

7. The method of claim 1 wherein:
following a period of inactivity, said method is reactivated solely by movement of an element containing said imaging array.

8. A method of optical tracking sensing comprising the following steps:
   a. illuminating a work surface for a preset exposure time,
   b. capturing a surface image with a two-dimensional imaging array,
   c. digitizing the outputs of said imaging array,
   d. compensating for non-uniformity of illumination by a real-time adaptive calibration, wherein a dark calibration and a light calibration are performed, said dark calibration occurring only once during an initialization of said method, said light source being off, so that offsets $V_{dark}(i,j)$ in the pixels' dark outputs are measured and stored for correction of subsequent outputs, and said light calibration occurs in real-time and adaptively while said imaging array is moving over said work surface,
   e. block matching said outputs to a reference frame, and
   f. calculating and outputting displacement vectors.

9. The method of claim 8 wherein:
a prediction of a displacement from said outputs to said reference frame is made, said prediction being made by sampling displacements over several frames to predict a displacement vector for the current frame relative to the reference frame, an average of the displacements for the previous several frames being taken as the predicted displacement for a current frame.

10. The method of claim 8 wherein:
following said block matching of said outputs to said reference frame, a displacement result is compared with said prediction of displacement.

11. The method of claim 8 wherein:
following said block matching of said outputs to said reference frame, a difference between a best block match comparison matrix and a "runner-up" block match comparison matrix is examined to ensure that "runner-up" matches are those neighboring said best block match.

12. The method of claim 8 wherein:
following said block matching of said outputs to said reference frame, said outputs are block matched to a second reference frame.

13. The method of claim 8 wherein:

following a period of inactivity, said method is reactivated solely by movement of an element containing said imaging array.

14. A method of optical tracking sensing comprising the following steps:

a. illuminating a work surface for a preset exposure time,
b. capturing a surface image with a two-dimensional imaging array,
c. digitizing the outputs of said imaging array,
d. block matching said outputs to a reference frame,
e. checking a correlation of said outputs to a reference frame by examining a difference between a best block match comparison matrix and a "runner-up" block match comparison matrix to ensure that "runner-up" matches are those neighboring said best block match, and
f. calculating and outputting displacement vectors.

15. The method of claim 14 wherein:

a prediction of a displacement from said outputs to said reference frame is made, said prediction being made by sampling displacements over several frames to predict a displacement vector for the current frame relative to the reference frame, an average of the displacements for the previous several frames being taken as the predicted displacement for a current frame.

16. The method of claim 14 wherein:

following said block matching of said outputs to said reference frame, a displacement result is compared with said prediction of displacement.

17. The method of claim 14 wherein:

following said block matching of said outputs to said reference frame, said outputs are block matched to a second reference frame.

18. The method of claim 14 wherein:

following a period of inactivity, said method is reactivated solely by movement of an element containing said imaging array.

* * * * *